United States Patent [19]

Smith

[11] Patent Number: 4,484,093
[45] Date of Patent: Nov. 20, 1984

[54] LINEAR MOTION DEVICE AND METHOD FOR INSERTING AND WITHDRAWING CONTROL RODS

[75] Inventor: Jay E. Smith, Pittsburgh, Pa.

[73] Assignee: The United States of America as represented by the United States Department of Energy, Washington, D.C.

[21] Appl. No.: 447,850

[22] Filed: Dec. 8, 1982

[51] Int. Cl.³ .............................................. G21C 7/08
[52] U.S. Cl. ................................ 310/14; 74/424.8 A; 310/83; 376/228; 376/232
[58] Field of Search ............................ 310/80, 83, 14; 376/228, 232, 234, 333, 236, 237, 238; 74/424.8 R, 424.8 A, 25

[56] References Cited

U.S. PATENT DOCUMENTS

| | | | |
|---|---|---|---|
| 2,780,740 | 3/1955 | Roman et al. | 310/67 R |
| 3,583,254 | 6/1971 | Winders | 74/424.8 R |
| 3,599,498 | 8/1971 | Misenti et al. | 74/25 |
| 3,762,227 | 10/1973 | Bohnhoff | 74/89.15 |
| 3,822,439 | 7/1974 | Wallin et al. | 74/424.8 R |
| 3,825,160 | 7/1974 | Lichtenberger et al. | 310/14 |
| 3,882,333 | 5/1975 | DeWeese | 310/14 |
| 3,946,258 | 3/1976 | Leshem | 310/14 |
| 3,959,071 | 5/1976 | Bevilacqua | 310/14 |
| 4,044,622 | 8/1977 | Matthews | 74/424.8 C |
| 4,238,288 | 12/1980 | Anikin et al. | 376/228 |

Primary Examiner—J. D. Miller
Assistant Examiner—D. L. Rebsch
Attorney, Agent, or Firm—Michael F. Esposito

[57] ABSTRACT

A linear motion device, more specifically a control rod drive mechanism (CRDM) for inserting and withdrawing control rods into a reactor core, is capable of independently and sequentially positioning two sets of control rods with a single motor stator and rotor. The CRDM disclosed can control more than one control rod lead screw without incurring a substantial increase in the size of the mechanism.

13 Claims, 10 Drawing Figures

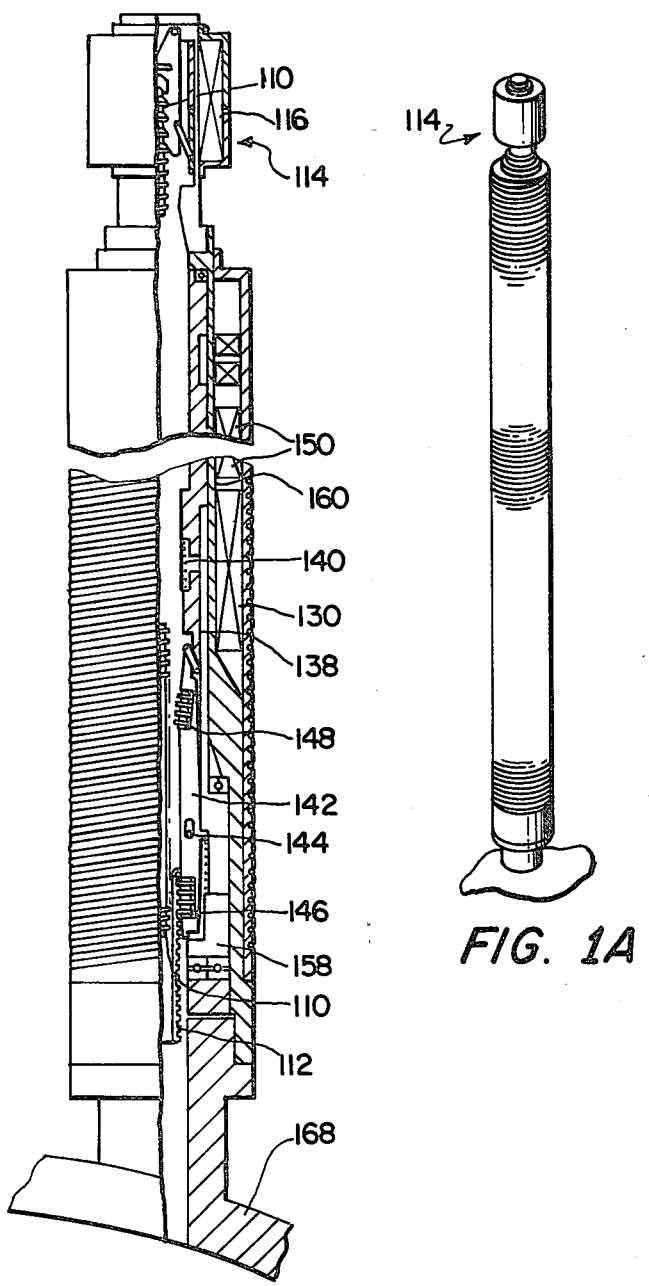
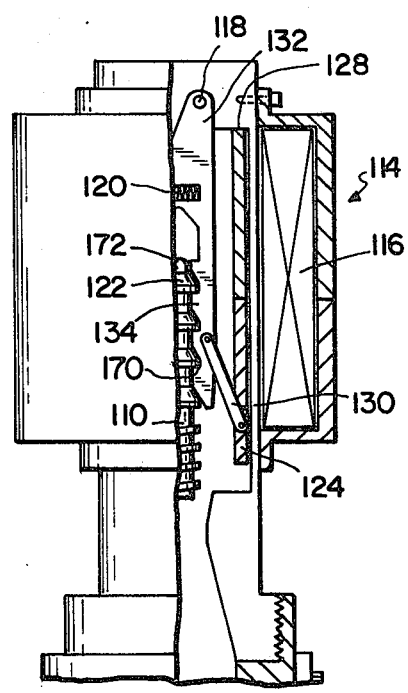
FIG. 1
FIG. 1A
FIG. 2

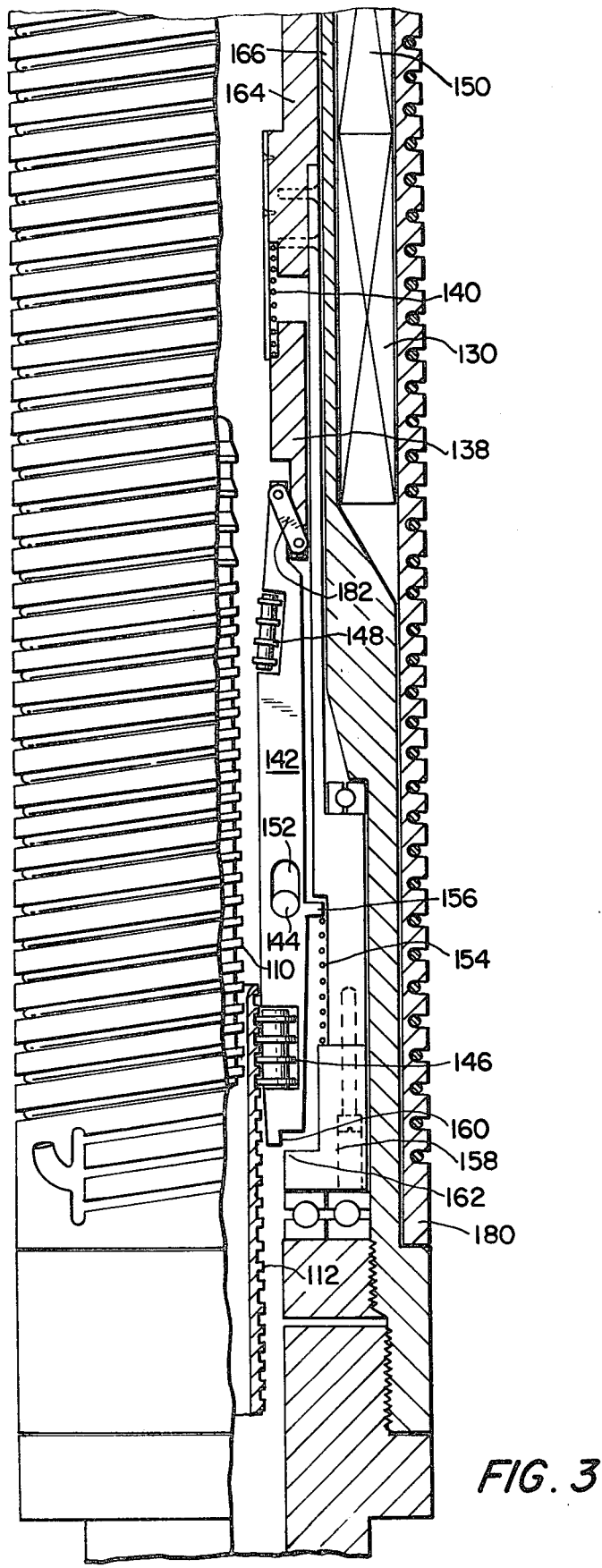
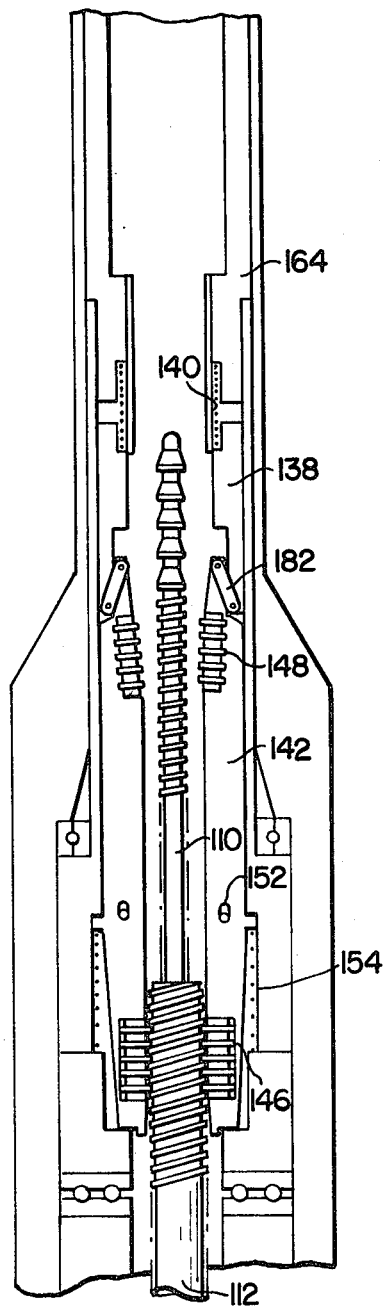
FIG. 3
FIG. 4A

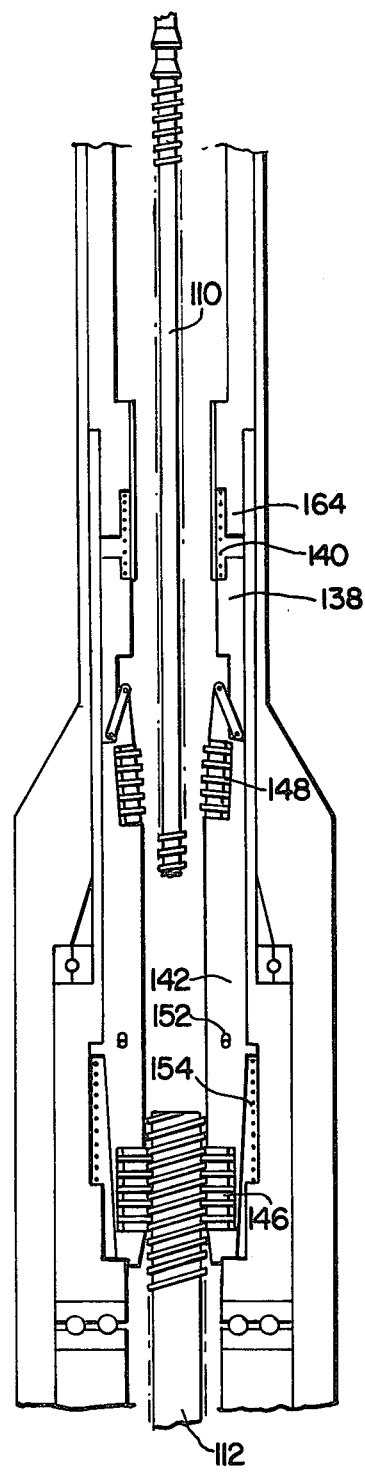
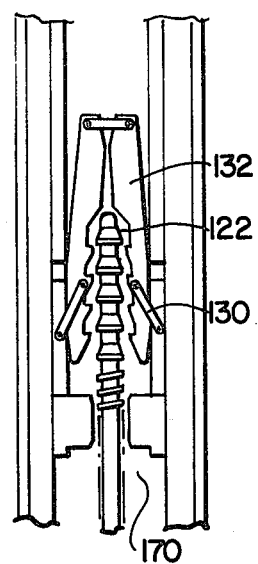
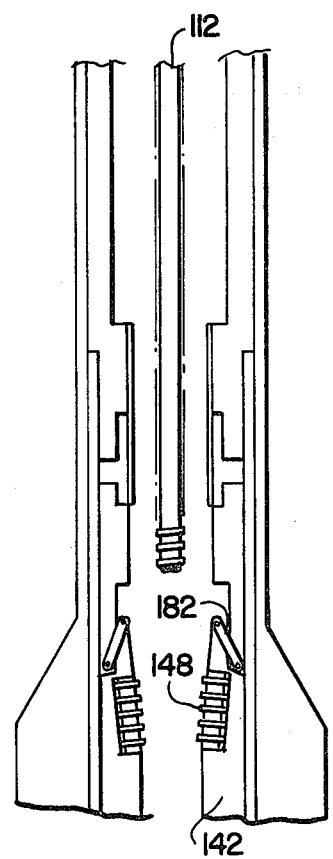
FIG. 4E
FIG. 4F

LINEAR MOTION DEVICE AND METHOD FOR INSERTING AND WITHDRAWING CONTROL RODS

The United States Government has rights in the invention pursuant to Contract No. EY-76-C-11-0014 between the United States Department of Energy and the Westinghouse Electric Corporation.

BACKGROUND OF THE INVENTION

The present invention relates to a linear motion device and to a method for inserting and withdrawing control rods, and more particularly to a control rod drive mechanism (CRDM) capable of independent and sequential positioning of two sets of control rods with a single motor stator and rotor.

Control rod drivers of the general class to which the present invention is related are disclosed in:

U.S. Pat. No. 3,946,258 to Leshem
U.S. Pat. No. 3,882,333 to DeWeese
U.S. Pat. No. 3,825,160 to Lichtenberger et al.
U.S. Pat. No. 3,822,439 to Wallin et al.
U.S. Pat. No. 3,599,498 to Misenti et al.
U.S. Pat. No. 3,583,254 to Winders et al.
U.S. Pat. No. 2,780,740 to Roman et al.

Control rods are generally used in nuclear reactors for controlling the output thereof. These rods must be finely adjusted for changes in output and for maintaining the output at desired levels. In the event that the reactor must be rapidly shut down, these control rods must also be capable of scramming, which requires that they be fully inserted into the reactor core as rapidly as possible.

These control rods must be driven by power from some source outside the reactor. Since the control rods are within the reactor core and, therefore, within the pressure vessel, the driving force must in some way be transmitted through the walls of the pressure vessel by using seals or some drive which permits a hermetic seal.

A large number of control rod drives are used within a single-reactor core. These are relatively close to one another, creating space problems, particularly where large non-cylindrical forms are used.

A known type of linear drive, particularly useful for control rods, operates on the principle of a spinning nut which is rotatable but held against axial movement and which meshes with a screwshaft that is moved longitudinally when the nut is rotated. Such a device is described, for instance, in U.S. Pat. No. 2,780,740 to Roman et al. or U.S. Pat. No. 3,822,439 to Wallin. In the known construction, the nut is formed of a plurality of roller-type nut sections, each carried by one arm of a lever of the first order and movable radially with rocking movement of the levers. The other arms of the levers constitute segments of the rotor of a synchronous reluctance motor. The levers are rockable in radial planes under the influence of the magnetic field of the motor and such rocking movement is effective to carry the roller sections into and out of mesh with screwshafts. The levers are biased in a direction which disengages the rollers but are held in the roller-meshing position by the magnetic field of the motor.

Under normal conditions, the field coils of the motor are energized at all times. When the load, such as a control rod, is to be moved, the field is rotated in the desired direction. When in the hold mode, the field is energized but stationary and the screwshaft and control rod are held against movement by the stationary nut sections, the threads of the nut sections and shaft being at a wedging angle so that the nut cannot be rotated by gravity. For scram, or in an emergency such as might occur in event of a power failure, the field coils are deenergized, the magnetic field collapses, and the screwshaft and rod are free to drop into the reactor.

Commercial nuclear reactors in general and light water breeder reactor (LWBR) designs in particular may employ a large number of identical fuel assemblies, each of which may be controlled by a separate single action control rod drive mechanism. Each fuel assembly of an LWBR may contain three types of control rods: (1) fixed, unmoving rods, (2) movable poison shutdown rods, and (3) movable thoria control rods. This general concept has been termed thoria finger control.

With regard to the thoria finger control concept and also for other control rod arrangements, for purposes of mechanical and hydraulic design and for physics and nuclear considerations, it would be advantageous to have a control rod drive mechanism capable of independently positioning two sets of rods on concentric lead screws. To date, this requirement can only be satisfied by piggybacking, upon each other, two "standard" single acting mechanisms of the general type discussed above. However, the resulting overall height becomes excessive. Additional problems from such an arrangement result from the fact that the loads carried by the uppermost mechanism must be transmitted though the motor tube of the lower mechanism, leading to additional mechanical design problems.

All of the patent references referred to above are designed to control only a single control rod lead screw. The inventions disclosed in U.S. Pat. Nos. 2,780,740; 3,585,254; 3,599,498; and 3,822,439 all relate to the standard collapsible rotor control drive mechanisms. Each controls only a single lead screw with either a scram or no scram on loss of power feature built in. There are, of course, situations where either of these features are desired. These collapsible rotor design control rod drive mechanisms have a rotating cage enclosing segment arms which carry roller nuts to engage a lead screw in a manner similar to the present invention. However, none of these mechanisms are applicable where there is a need to axially position two concentric control rod leadscrews, unless two cage assemblies, motor coils, etc. are positioned one atop the other, which is a very undesirable situation, both from a size and mechanical design standpoint.

In fact, such a piggyback arrangement would more than double the height of the control rod drive mechanism and the complexity of the control drive power supplies and cooling systems. For a reactor core height of twelve feet, the resulting mechanism length would be 27–30 feet.

The inventions disclosed in U.S. Pat. Nos. 3,825,160; 3,882,333; and 3,946,258 all relate to the design or improvements of a type of jack with a plurality of latches alternately engaging and disengaging a long "jackshaft" which takes the place of the leadscrew in the collapsible rotor design. Although this design is in very common use in commercial reactors, it is not useful if two concentric shafts or leadscrews need to be positioned unless, again, the height of the mechanism is more than doubled. Moreover, this design is inherently incapable of exerting any inward force on the control rods, which is desirable in many applications.

SUMMARY OF THE INVENTION

It is therefore an object of the present invention to provide an improved linear motion device.

It is a further object of the present invention to provide an improved CRDM and method of independently controlling two sets of rods using a single motor.

It is a still further object of the present invention to provide a CRDM which can control more than one lead screw without a substantial increase in the size of the mechanism.

The CRDM of the present invention avoids the problems associated with the prior art by making use of the fact that in normal operation the two sets of rods in the thoria finger control system have the poison rods fully withdrawn to the top of the core before the thoria control rods are positioned for criticality. Thus the present invention utilizes sequentially acting dual action CRDM. This mechanism employs a single drive motor which first latches and withdraws the poison rods to full withdrawal and then latches and withdraws the thoria control rods to achieve criticality.

The CRDM, in accordance with the present invention, may preferably comprise a roller nut rocker arm assembly having at least two sets of roller nuts, a movable magnetic slug, and a linkage for connecting the roller nut rocker arm assembly. The roller nut rocker arm assembly is functionally similar to the collapsible rotor of more conventional rod drive mechanisms. Its function is to pivot about a point to enable one or the other (but not both) of the two sets of roller nuts to engage lead screws. The upper set of roller nuts may preferably engage an inner of two concentric lead screws and the lower set engages an outer lead screw. The force, which is applied to cause the pivot action of the roller nut rocker arm assembly, may preferably be applied by energizing a magnetic field in the immediate vicinity of an element such as a movable slug. The magnetic field causes the movable slug to be drawn toward an element such as a fixed pole against the action of a bias such as a return spring.

In the embodiment discussed above, when the slug moves, the rocker arm assembly pivots until the upper roller nut set engages the innermost lead screw. Subsequent energization of the motor coils causes the rotor and rocker arm assembly to rotate and thereby withdraw the associated control rod. As the roller nuts begin to carry the load of the inner lead screw, the rocker arm assembly translates downward slightly so that the load is carried by an element such as a thrust block rather than by the pivot pins of the roller nut rocker arm assembly. When fully withdrawn, the inner lead screw may preferably be latched in the fully withdrawn position by an appropriate magnetic latch which may be scrammed in a loss of power situation.

After the inner lead screw is fully withdrawn and latched, a DC coil near the rocker arm assembly is deenergized and the various components return to their original position under spring action or the like. In this position the lower set of roller nuts will preferably engage the outer lead screw. In addition, in this position all components have pivoted clear of the path through which the outer lead screw will travel. Energizing the same motor coils used previouly causes rotation of the rocker arm assembly which in turn begins to assume the load of the outer lead screw. As this happens, the rocker arm assembly translates downward, for example on the order of about ¼ inch to contact a thrust block or the like. A locking device or "shoulder lock" may preferably be used to cause the lower set of roller nuts to be permanently engaged to the outer lead screw whenever the lead screw is withdrawn any distance. This obviates any possible ratcheting problems as well as any possibility of binding should the movable magnetic slug tend to move upward for any reason. Further rotation of the roter causes the outer lead screw to be withdrawn.

Thus, the rocker arm assembly of the present invention will preferably function as a collapsible (and therefore scrammable) rotor while withdrawing the poison rods and as a non-collapsible rotor while withdrawing or holding the thoria fingers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate preferred embodiments of the invention and together with the description serve to explain the principles of the invention. Corresponding elements in the various figures are indicated with the same numerical indicia. In the drawings:

FIG. 1 is a fragmentary, sectional view of a dual action CRDM for activating both inner and outer control rod lead screws;

FIG. 1a is a perspective view of the CRDM of FIG. 1;

FIG. 2 is a plan, partial view of the latch mechanism of the CRDM of FIG. 1;

FIG. 3 is a plan, partial view illustrating details of the drive mechanism of FIG. 1;

FIGS. 4A–4F are schematic representations depicting in diagram form several different positions the CRDM can assume during operation.

DETAILED DESCRIPTION OF THE INVENTION

Figures 4B, 4C, 4D:
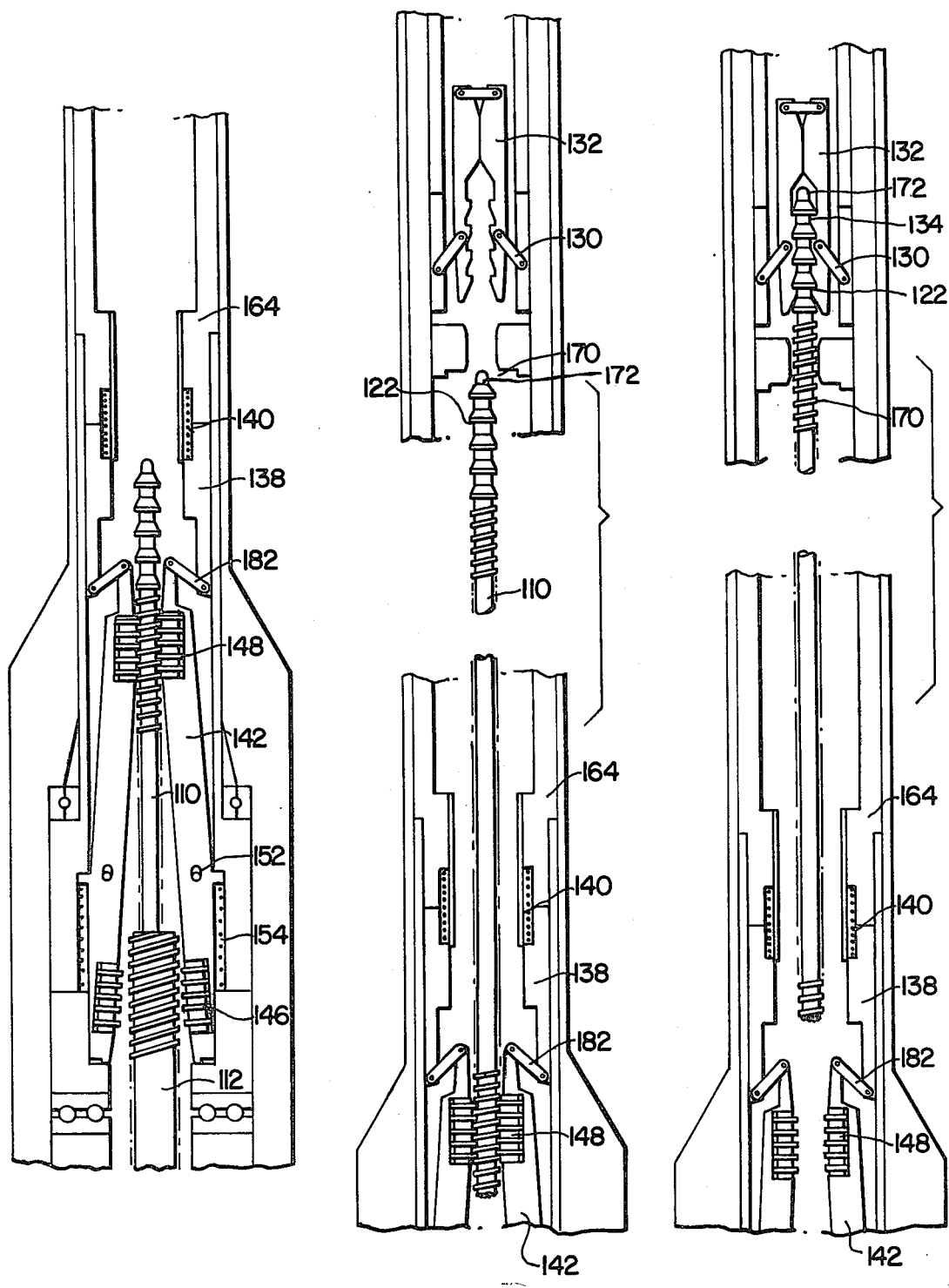

The dual action CRDM of the present invention performs two independent (but sequential) functions on two concentric lead screws or actuators to positionally control two sets of reactor control elements utilizing a single activator. As best shown in FIG. 1, the mechanism preferably utilizes an inner lead screw 110 which is shown in its fully inserted or "down" position and a concentric outer lead screw 112, also shown in its fully inserted position. As described above, one of the lead screws may preferably be used in a thoria finger control system to control the position of poison rods and the other lead screw to control the position of thoria control rods. As will be explained more fully below, the CRDM of the present invention employs a single drive motor for sequentially operating the poison rods and then the thoria control rods to achieve criticality in the reactor.

For clarity, the topmost section of the inner lead screw 110 is drawn twice in FIG. 1, once in the fully inserted position and again as it would appear when captured by the latching device 114 when fully withdrawn. The latching device 114 is illustrated as it would appear with the latch coil 116 energized.

Turning briefly to FIG. 2, there is illustrated a latching mechanism according to the present invention showing the inner lead screw 110 in its fully withdrawn or captured position (the topmost position illustrated in FIG. 1). Spring 120 normally urges latch member 132 outwardly to free the head of the lead screw 110 so that it can be operated by the CRDM as described below. When the coil 116 is energized, movable pole 124 is urged against fixed pole 128. Pivot arm 130 then urges the latch 132 to pivot clockwise about pivot 118 against the force of spring 120. Sawteeth 134 on latch 132 engage complimentary sawteeth 122 on the lead portion of lead screw 110 at the interface of their respective working surfaces to positively latch the lead screw in the fully withdrawn position. When coil 116 is deenergized, the latch will pivot counter-clockwise under the force of spring 120, thereby allowing the leadscrew 110 to insert its associate rod into the reactor core. Beveled opening 170 is provided in the latch mechanism to orient and align the head portion 172 of the inner lead screw 110 as it passes upward through the opening 170.

Turning again to FIG. 1, when the DC activated coil 130 is energized, the movable magnetic slug 138, which is of a cylindrical geometry, is pulled upward against the force of return spring 140. Through a linkage (described below), this movement causes roller nut rocker arm assembly 142 to pivot about its pivot pin 144 so that the lower roller nuts 146 disengage from the outer lead screw 112. Simultaneously, the upper roller nuts 148 engage the inner lead screw 110. To restate, the magnetic slug 138, when moved axially, imparts a pivoting motion to the rocker arm assembly 142 on which is mounted two sets of roller nuts 146 and 148. These roller nuts engage one or the other of two concentric lead screws 110, 112 to thereby achieve a dual action drive mechanism, particularly useful for LWBR which may employ thoria finger control.

The entire assembly may be caused to rotate under the action of a rotating magnetic field caused by appropriately energizing the motor coils 150. As best seen in FIG. 3, as the rocker arm assembly 142 and rotor continue to rotate, the inner lead screw 110 is withdrawn until it engages the latching device 114 (FIG. 1). After transferring the load from the upper roller nuts 148 to the latching device 114, the DC activated coil 130 is deenergized which permits the return spring 140 to cause the movable magnetic slug 138 to return to the position shown in FIGS. 1 and 3, where the lower roller nuts 146 engage the outer lead screw 112. In this operation, rotating the assembly with the motor coils 150 act to withdraw the outer lead screw 112 to the desired position. As shown in FIGS. 1 and 3, in this position the upper roller nuts 148 have pivoted out of the path of the outer lead screw 112.

As can be seen in FIGS. 4A–F, a set of roller nuts will preferably consist of two diametrically opposed nuts. It will be appreciated by the artisan that other arrangements of roller nuts circumferentially spaced about the lead screws can also be used.

The slot 152 (see FIG. 3), in which the pivot pin 144 is located, is dimensioned and positioned so that the roller nut rocker arm assembly 142 is free to translate downward slightly against an opposing spring force created by the action of spring 154 acting against the shoulder 156 of the roller nut rocker arm assembly 142 under the action of either lead screw load. This permits all axial loads to be transferred directly to the thrust block 158 when either lead screw is being withdrawn. In addition, a step 160, provided at the bottom end of the roller nut rocker arm assembly, cooperates with the complementary step 162 on the lower thrust block to provide a lock to ensure that the outer lead screw 112 cannot be disengaged once its load has been assumed by the lower roller nuts 146. A pivot arm 182, pinned at one end to the rocker arm assembly 142 and at the other end to the movable magnetic slug 138, also functions to permit the pivoting operation of the roller nut rocker arm assembly as described above.

Fixed pole 164 is provided to act as a retaining surface for return spring 140 and as an upper limit to the motion of movable magnetic slug 138. A motor tube 166 is also provided between the various motor and DC activated coils and the movable elements of the mechanism.

The mechanism is attached to the core vessel 168 of a reactor in an appropriate manner and orientation for operating the various rods.

The operation of the drive mechanism will now be described in connection with FIGS. 4A–4F.

Turning now to FIG. 4A, the mechanism is depicted as it would be oriented prior to start up of a reactor core with both of its sets of control rods fully inserted into the core. Under these conditions the inner lead screw 110 and the outer lead screw 112 are fully lowered with the lower roller nuts 146 engaged with the outer lead screw 112 and the upper roller nuts 148 pivoted away from the inner lead screw 110.

During start up of the reactor the inner lead screws 110, which typically control the poison shutdown rods, must be withdrawn from the reactor. As shown in FIG. 4B, this is accomplished by energizing the coils 130 (see FIG. 3) so as to move the movable slug 138 against the bias of the return spring 140 to abut the fixed pole 164. This causes the rocker arm assembly 142 to pivot about its pivot pin 144, whereby the lower roller nuts 140 simultaneously engage the inner lead screw 110. Upon engagement, the rocker arm translates slightly downward so that the thrust block 162 supports the load of the rocker arm and its engaged lead screw.

In order to move the inner lead screw 110, the field coils 150 (see FIG. 1) are energized with a properly rotating field, causing the rocker arm assembly to rotate relative to the lead screw, thereby causing the lead screw 110 to withdraw from the reactor core.

As the inner lead screw 110 continues to be withdrawn, it eventually approaches the latching mechanism, FIG. 4C. The head portion 172 of the screw 110 is rounded and is designed to self-align with the beveled opening 170 of the latch mechanism.

As the screw 110 continues to be withdrawn, it will eventually be captured as shown in FIG. 4D by the sawteeth 122 on the screw 110. As described above and depicted in FIG. 1, the latch basically comprises a pair of spring biased, leg members 132 which pivot according to the position of a coil energized movable slug 124 into an engaged or disengaged position.

After the inner lead screw 110 has been withdrawn, the coil 130 (FIG. 1) is deenergized, and movable slug 138 will return to its lowered position under the influence of return spring 140. This causes the rocker arm 142 to pivot, putting lower roller nuts 146 into engagement with the outer lead screw 112. The load of the lead screw is again carried by the thrust block 162 and rocker arm shoulder 160 as depicted in FIG. 3. Energization of the field coils 150 with a rotating field will cause the control rod attached to the screw 112 to be withdrawn (or inserted depending upon the direction of rotation of the field). It is control of the outer lead screw which is used to regulate the reactor core during operation. Note that during operation, the inner lead screw with its attached poison rod remains completely withdrawn from the core and latched. The outer lead screw may be anywhere from fully inserted to fully withdrawn and remains engaged and under the control of the lower roller nuts and field coil energization.

Referring to FIG. 4F, in the event it becomes necessary to scram the reactor during operation, the pivoting legs 132 of the latch mechanism are pivoted apart under the control of the latch coil 116 (FIG. 2) to disengage the screw 110 from the latch, thus dropping the poison rods into the reactor to shut it down.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modications as are suited to the particular use contemplated. It is intended that the scope of the invention be defined by the claims appended hereto.

I claim:

1. A linear motion device, for independently controlling two sets of activators, comprising an inner lead member and outer lead member adapted to be connected to said activators, first and second threaded means for controlling the position of said lead members, a rocker arm assembly including a block to carry the load of said lead members when said rocker arm moves downward to pivot said first and second threaded means into engagement with one or the other of said lead members and a magnetically activated moveable slug for activating said rocker arm assembly.

2. The linear motion device of claim 1, wherein said inner and outer lead members are arranged concentrically.

3. The linear motion device of claim 2, further including a motor for independently positioning said inner and outer concentric lead members.

4. The linear motion device of claim 1, wherein said first and second threaded means comprise first and second roller nuts respectively.

5. The linear motion device of claim 1, further including controllable magnetic field means positioned in the vicinity of said movable slug for moving said slug toward a fixed pole.

6. The linear motion device of claim 5, further including a return spring for biasing said removable slug away from said fixed slug wherein said movable slug operates against the action of said spring.

7. The linear motion device of claim 3, further including a latching means for latching said inner lead member.

8. A sequentially operated, dual action control rod drive mechanism for independently positioning two control elements comprising:
concentric inner and outer lead screws adapted to control the position of said control elements;
first and second sets of roller nuts for engaging either one or the other of said concentric lead screws to control the axial position thereof;
roller nut rocker arm assembly for pivoting said first and second roller nuts into said engagement;
means for pivoting said rocker arm assembly including a moveably magnetic slug and a coil for activating said slug; and
a thrust block to carry the load of said inner lead screw when said rocker arm translates downward.

9. The sequentially operated, dual action control rod drive mechanism of claim 8, wherein said pivoting means further includes a fixed pole positioned axially with said movable slug and a return spring biasing said movable slug away from fixed pole whereby when said coil is activated said movable pole is caused to move toward said fixed pole against the action of said return spring.

10. The sequentially operated, dual action control rod drive mechanism of claim 8, wherein said coil, when continuously energized, is operable to cause said rocker arm assembly and rotor to rotate to thereby control the position of the lead screws.

11. The sequentially operated, dual action control rod drive mechanism of claim 8, including pin and slot means associated with said roller nut rocker arm assembly for permitting said assembly to pivot and translate.

12. The sequentially operated, dual action control rod drive mechanism of claim 8, including latching means for latching said inner lead screw.

13. The sequentially operated, dual action control rod drive mechanism of claim 10, further including a locking means for engaging said lower roller nuts with said outer lead screw whenever said outer lead screw is not in a fully inserted position.

* * * * *